US010760984B2

United States Patent
Eisenbeiss et al.

(10) Patent No.: US 10,760,984 B2
(45) Date of Patent: Sep. 1, 2020

(54) WHEEL-FORCE DYNAMOMETER FOR MEASURING TIRE FORCES

(71) Applicant: ZF Friedrichshafen AG, Friedrichshafen (DE)

(72) Inventors: Jens Eisenbeiss, Fuerstenzell (DE); Roland Bösl, Neuburg am Inn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 148 days.

(21) Appl. No.: 15/781,762

(22) PCT Filed: Nov. 8, 2016

(86) PCT No.: PCT/EP2016/076898
§ 371 (c)(1),
(2) Date: Jun. 6, 2018

(87) PCT Pub. No.: WO2017/097515
PCT Pub. Date: Jun. 15, 2017

(65) Prior Publication Data
US 2018/0372568 A1    Dec. 27, 2018

(30) Foreign Application Priority Data
Dec. 8, 2015    (DE) .......................... 10 2015 224 636

(51) Int. Cl.
*G01L 5/16*    (2020.01)
*G01L 5/20*    (2006.01)
(Continued)

(52) U.S. Cl.
CPC .................. *G01L 5/16* (2013.01); *G01L 5/20* (2013.01); *G01M 1/04* (2013.01); *G01M 1/045* (2013.01);
(Continued)

(58) Field of Classification Search
None
See application file for complete search history.

(56) References Cited

U.S. PATENT DOCUMENTS 3,948,095 A    4/1976   Burgett et al.
4,726,690 A    2/1988   Thelen
(Continued)

FOREIGN PATENT DOCUMENTS

CH    500 480        12/1970
DE    1 201 581 B    9/1965
(Continued)

OTHER PUBLICATIONS

German Search Report Corresponding to 10 2015 224 636.1 dated Oct. 7, 2016.
(Continued)

*Primary Examiner* — Andre J Allen
(74) *Attorney, Agent, or Firm* — Davis & Bujold PLLC; Michael J. Bujold

(57) ABSTRACT

A wheel-force dynamometer (1) for the measurement of forces and torques acting upon a vehicle tire (2a) and a vehicle wheel (2) using force sensors (4, 24, 44). The vehicle wheel (2) is mounted and able to rotate on a wheel axle. The wheel-force dynamometer (1) has a wheel axle that is in the form of a hollow shaft (9, 29, 49) which is hydrostatically mounted on a rigid, fixed in position bearing journal (3, 23, 43).

16 Claims, 3 Drawing Sheets

(51) Int. Cl.
*G01M 1/04* (2006.01)
*G01M 1/22* (2006.01)
*G01M 17/02* (2006.01)
*G01M 1/16* (2006.01)

(52) U.S. Cl.
CPC .............. *G01M 1/16* (2013.01); *G01M 1/225* (2013.01); *G01M 17/021* (2013.01); *G01M 17/024* (2013.01)

(56) References Cited

U.S. PATENT DOCUMENTS

| | | | |
|---|---|---|---|
| 4,753,110 A | 6/1988 | Burchett et al. | |
| 5,063,773 A | 11/1991 | Fujimori et al. | |
| 6,453,567 B1* | 9/2002 | Naruse | G01B 5/255 33/203 |
| 2002/0124650 A1* | 9/2002 | Matsumoto | G01M 1/045 73/460 |
| 2013/0024137 A1* | 1/2013 | Grassi | G01L 3/108 702/43 |
| 2016/0333888 A1 | 11/2016 | Miyahara et al. | |
| 2019/0056283 A1* | 2/2019 | Eisenbeiss | G01M 1/24 |

FOREIGN PATENT DOCUMENTS

| | | |
|---|---|---|
| DE | 1 281 713 B | 10/1968 |
| DE | 36 12 599 A1 | 10/1987 |
| DE | 690 23 313 T2 | 3/1996 |
| DE | 198 44 975 A1 | 3/2000 |
| DE | 100 04 419 A1 | 12/2000 |
| DE | 100 44 291 A1 | 9/2001 |
| DE | 102 60 000 A1 | 7/2004 |
| DE | 10 2008 034 484 A1 | 1/2010 |
| EP | 0 192 789 A1 | 9/1986 |
| EP | 0 735 356 A2 | 10/1996 |
| EP | 1 239 275 A2 | 9/2002 |
| EP | 2 187 193 A2 | 5/2010 |
| EP | 2 602 602 A1 | 6/2013 |
| WO | 2015/146735 A1 | 10/2015 |

OTHER PUBLICATIONS

German Search Report Corresponding to 10 2015 224 638.8 dated Oct. 17, 2016.
International Search Report Corresponding to PCT/EP2016/076898 dated Feb. 6, 2017.
International Search Report Corresponding to PCT/EP2016/076897 dated Feb. 1, 2017.
Written Opinion Corresponding to PCT/EP2016/076898 dated Feb. 6, 2017.
Written Opinion Corresponding to PCT/EP2016/076897 dated Feb. 1, 2017.

* cited by examiner

WHEEL-FORCE DYNAMOMETER FOR MEASURING TIRE FORCES

This application is a National Stage completion of PCT/EP2016/076898 filed Nov. 8, 2016, which claims priority from German patent application serial no. 10 2015 224 636.1 filed Dec. 8, 2015.

FIELD OF THE INVENTION

The invention relates to a wheel-force dynamometer.

BACKGROUND OF THE INVENTION

From DE 102 60 000 B4 by the present applicant a wheel-force dynamometer for measuring tire forces is known, wherein a vehicle wheel is fixed onto a wheel axle which is mounted by roller bearings in a hollow shaft. The hollow shaft is mounted hydrostatically in a housing fixed to a frame and has a collar in which force sensors for the measurement of forces and torques are arranged. The forces acting on the wheel are thus transmitted, via the wheel axle, to the hollow shaft, which for its part "floats" in a frictionless manner by hydrostatic means in the housing. During the measurement of tire forces by a wheel-force dynamometer measurement errors can occur, which are determined by the design of the measuring device and its vibration behavior.

SUMMARY OF THE INVENTION

An objective of the present invention is to avoid or reduce measurement errors in a wheel-force dynamometer of the type mentioned to begin with.

The invention comprises the characteristics specified in the independent claims. Advantageous design features emerge from the subordinate claims.

According to the invention it is provided that the wheel axle to which the vehicle wheel is fixed is in the form of a hollow shaft mounted on a rigid, positionally fixed bearing journal. Since the wheel axle is no longer—as in the prior art—made solid and mounted inside a hollow shaft, but according to the invention is itself in the form of a hollow shaft, owing to the larger diameter and the annular cross-section a maximum modulus of resistance and hence high rigidity are achieved. Furthermore the mass of the wheel axle is reduced. On the other hand a rigid bearing journal is provided, on which the hollow shaft is mounted. The positionally fixed bearing journal in combination with the hollow shaft result in an exceptionally rigid wheel mounting, which under the action of the tire forces that occur during measurements undergoes only very slight deformations. The invention starts from the recognition that a reason for the measurement errors relates to a relatively low natural frequency of the measurement device compared with the measurement frequencies desired in the context of a so-termed High Speed Uniformity (HSU) measurement. The wheel mounting according to the invention, with the hollow shaft and the rigid bearing journal, result in high rigidity and hence a relatively high natural frequency of the wheel-force dynamometer. The occurrence of resonances at the measurement frequencies can therefore be avoided, since these are below the high natural frequencies of the wheel mounting. This results in optimized transfer functions, which show lower amplitude increase and lower phase shifts.

According to a preferred embodiment the bearing journal is in the form of a hollow journal with an annular cross-section having a high modulus of resistance and low mass, which results in higher natural frequencies. Preferably the hollow journal has a tapering annular cross-section which increases from its free end toward the clamped end. This gives a maximum cross-section at the clamped end of the hollow journal, where the stress on it is greatest.

In a further preferred embodiment the hollow shaft is mounted relative to the bearing journal by hydrostatic slide bearings. In hydrostatic slide bearings the necessary lubrication oil is provided by an additional lubrication oil pump, which delivers the lubrication oil under pressure into the lubrication gap. For hydrostatic slide bearings this has the advantage that already on starting, i.e. at low rotational speeds, there is minimal friction. A further advantage is that compared with conventional roller bearings, hydrostatic slide bearings have higher rigidity, even at very low excitation frequencies. At higher frequencies, namely those relevant for the measurement of High Speed Uniformity (HSU), the rigidity is very much greater than with roller bearings. Accordingly the hydrostatic slide bearings contribute substantially toward making full use of the rigidity potential of the wheel bearing, i.e. toward increasing the natural frequency of the measurement device.

According to another preferred embodiment, the bearing journal has a collar that rests against a positionally fixed supporting structure. This realizes the concept of a cantilevered beam, with high rigidity and a high natural frequency.

In a further preferred embodiment the force sensors are arranged between the collar of the bearing journal and the supporting structure. Thus, around the circumference of the collar can be arranged a plurality of in part different force sensors for measuring the tire forces.

In further preferred embodiments the hydrostatic slide bearings are designed as radial and axial bearings, wherein two radial bearings a distance apart from one another are preferred. This too increases the rigidity of the bearing design.

According to an also particularly preferred embodiment of the invention, it is provided that a first and a second slide bearing, in the form of conical bearings, are arranged on the bearing journal. This too increases the rigidity of the bearing design while at the same time ensuring low-friction rotation of the hollow shaft relative to the journal, so that in addition only a minimum number of slide bearings, namely two slide bearings, are needed.

In another preferred embodiment, an axial bearing is arranged inside the hollow journal and connected to the hollow shaft by a supporting shaft. Thus, the supporting shaft transfers the axial forces from the hollow shaft into the axial bearing. In this way the hollow space in the hollow journal can be used for accommodating the axial bearing, so that space can be saved in the radial direction.

According to a further preferred embodiment, at its end on the wheel side the hollow shaft is connected firmly to a supporting disk, which serves mainly to connect the vehicle wheel, in particular its rim. Furthermore, the supporting disk also serves to connect the supporting shaft for the inner axial bearing.

In another preferred embodiment, wheel flange adapters are arranged on the supporting disk, which enable wheel rims with various rim dimensions to be attached to the supporting disk.

According to a further preferred embodiment, centering rings are arranged on the supporting disk, which center the rim or the wheel relative to the hollow shaft.

BRIEF DESCRIPTION OF THE DRAWINGS

Example embodiments of the invention are shown in the drawings and will be described in greater detail below, so that further features and/or advantages can emerge from the description and/or the drawings, which show.

DETAILED DESCRIPTION OF THE PREFERRED EMBODIMENTS

Figure 1:
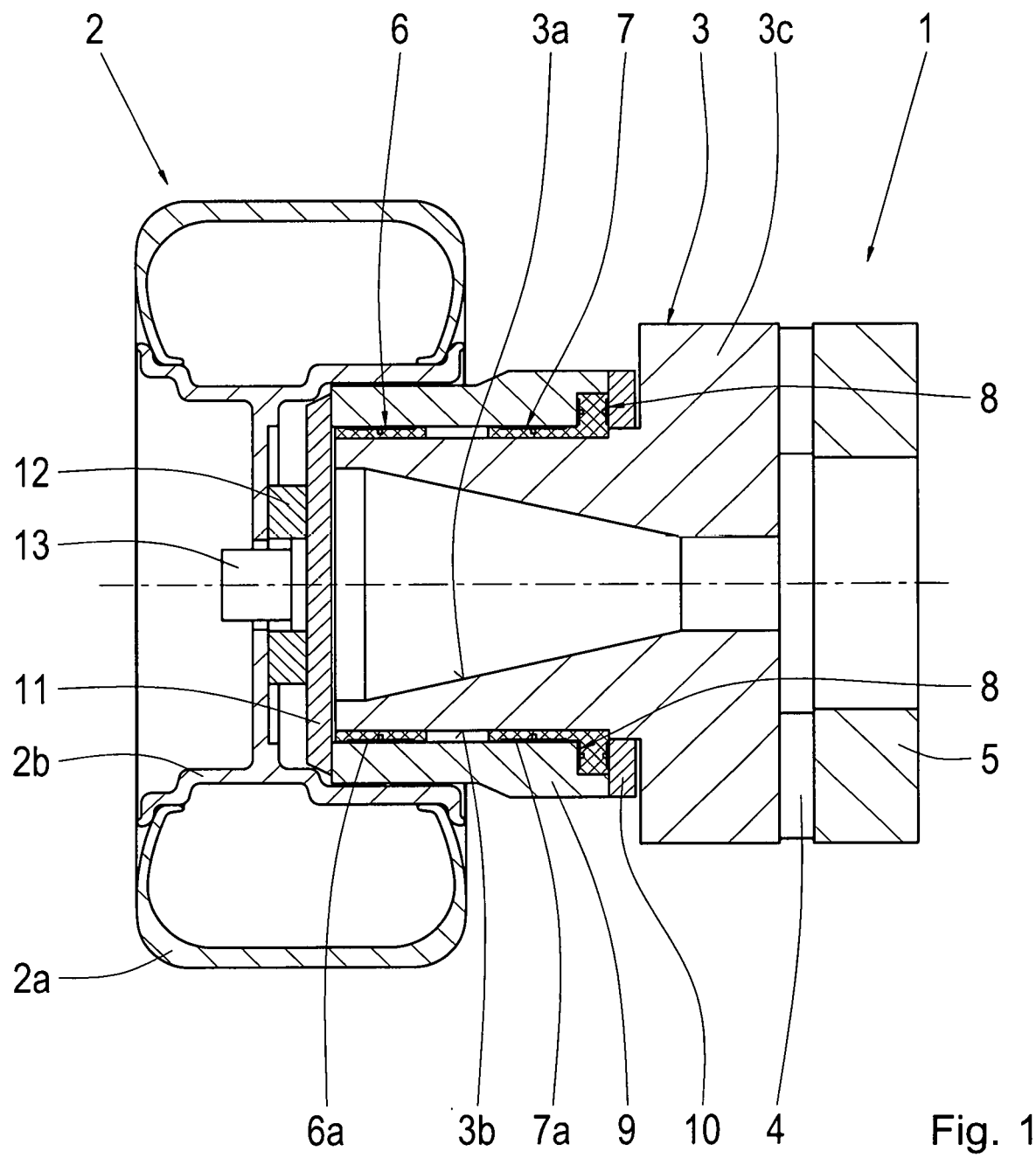
FIG. 1: A first example embodiment of the invention for mounting a wheel on a wheel-force dynamometer by means of a hollow shaft and bearing journal.

FIG. 1 shows, as a first example embodiment of the invention, a wheel-force dynamometer 1, i.e. a device for measuring forces and torques on a rotating vehicle wheel 2, also just called the wheel 2 for short in what follows. In particular this is used for measuring the uniformity of tires and wheels at high speeds, namely measuring the High Speed Uniformity (HSU). The wheel-force dynamometer 1, or measurement device 1 for short in what follows, comprises a rigid bearing journal 3 supported via force sensors 4 on a positionally fixed supporting structure 5. The bearing journal 3 is in the form of a hollow journal and has an inside surface 3a which is partially conical and partially cylindrical, so that in the direction toward the supporting structure 5 it has an increasing supporting annular cross-section. The hollow journal 3 also has a substantially cylindrical bearing seat 3b and a relatively solid collar 3c by which the bearing journal 3 is supported. On the bearing seat 3b are arranged a first hydrostatic slide bearing 6 in the form of a radial bearing, a second hydrostatic slide bearing 7 in the form of a radial bearing, and a third hydrostatic slide bearing 8 in the form of an axial bearing. A hollow shaft 9 is supported radially and axially relative to the hollow journal 3 by the hydrostatic slide bearings 6, 7 and 8. The first and second hydrostatic slide bearings 6, 7 have on theft outer periphery lubrication pockets 6a, 7a, which are supplied with lubrication oil by a pressure oil delivery system (not shown), so that a permanent lubricant film is maintained between the radial bearings 6, 7 and the inside surface of the hollow shaft 9. At its end facing the collar 3c, the hollow shaft 9 has a pressure ring 10 which is attached on one side to the hollow shaft 9 and rests against the axial bearing 8. Thus, the hollow shaft 9 is fixed to the bearing journal 3 in the axial direction. The vehicle wheel 2 is fixed to the hollow shaft 9 by means of a supporting disk 11 arranged on and fixed to the end of the hollow shaft 9 facing toward the wheel 2. The wheel 2 has a tire 2a arranged on a wheel rim 2b, also called the rim 2b for short. The rim 2b is connected to the supporting disk 11 by a wheel flange adapter 12. In addition a centering ring 13 is provided, which ensures that the wheel 2 is centered relative to the hollow shaft 9. In the area of the first radial bearing 6, the hollow shaft 9 has a maximum outer diameter which is limited by the inside diameter of the wheel rim 2b; the fitting space present inside the rim 2b is thus used optimally in favor of a maximum modulus of resistance of the hollow shaft 9.

The mounting of the wheel 2 relative to the positionally fixed supporting structure 5 is designed as a rigid assembly so that the measurement device 1 has an as high as possible natural frequency. Thus, the measurement frequency at which the forces and torques are determined in a HSU measurement is substantially lower than the natural frequency of the measurement device. Resonances between the natural frequency of the measurement device 1 and the measurement frequencies can thereby largely be avoided, so that resonance-related measurement errors such as amplitude elevations or phase shifts are minimized.

During the measurement the wheel 2 rolls on a real or simulated road (not shown), for example a running drum, and is loaded with a defined wheel load. The forces and torques resulting from this are transmitted via the wheel rim 2b and the supporting disk 11 to the hollow shaft 9 and from there via the hydrostatic slide bearings 6, 7, 8 to the bearing journal 3, which is supported by means of its collar 3c via the force sensors 4 on the supporting assembly 5.

Figure 2:
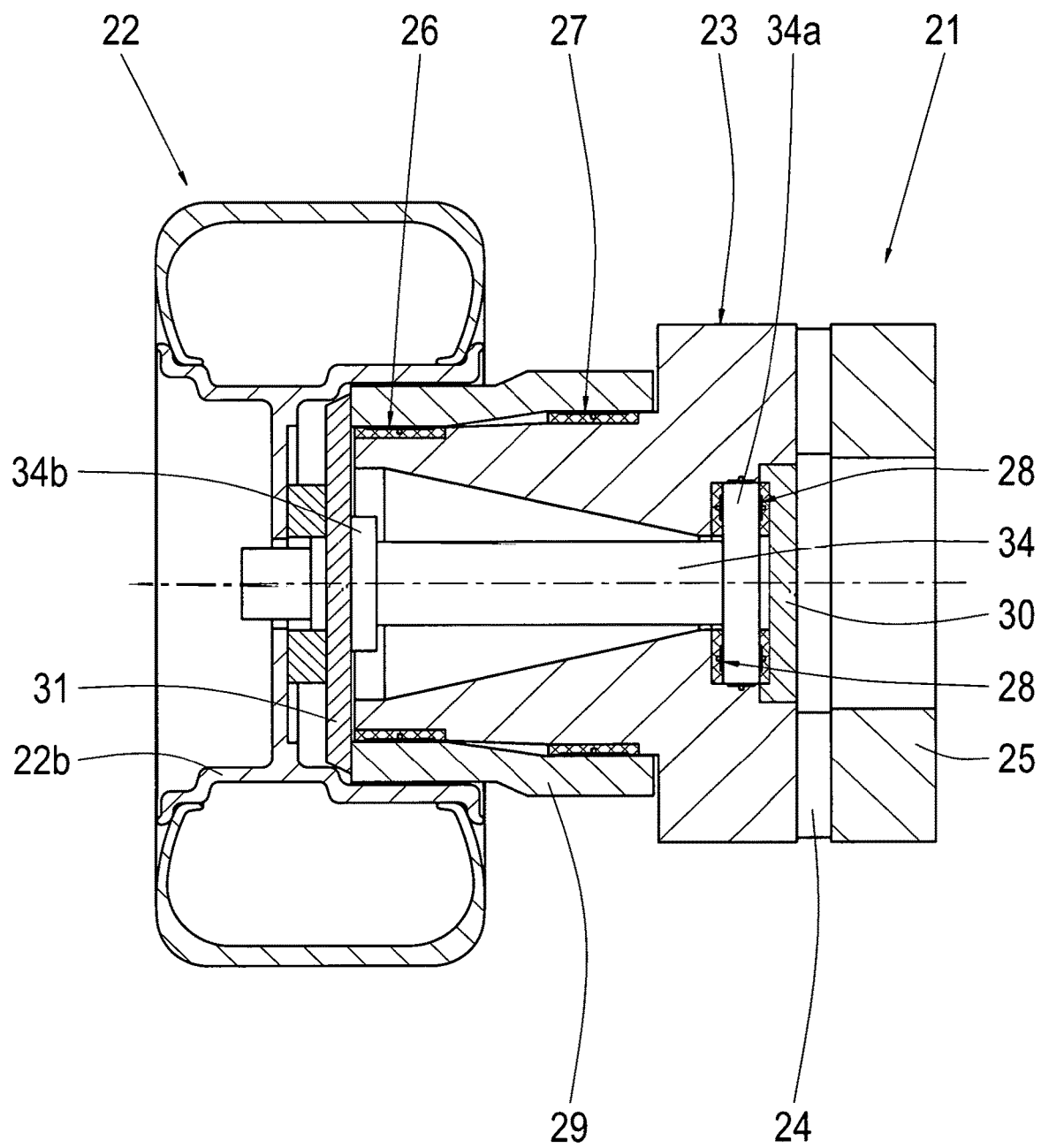
FIG. 2: A second example embodiment of the invention, for a wheel mounting with an alternative axial bearing.

FIG. 2 shows a second example embodiment of the invention for a wheel-force dynamometer 21. In the figure, the same or analogous components as in FIG. 1 are denoted by the same indexes, but increased by 20. A hollow shaft 29 is mounted by means of two hydrostatic slide bearings in the form of a first radial bearing 26 and a second radial bearing 27, on a bearing journal 23 in the form of a hollow journal, which is supported via force sensors 24 on a positionally fixed supporting structure 25. The free end of the hollow shaft 29 on the wheel side is connected solidly to a supporting disk 31, The outer diameter of the hollow shaft 29 is only slightly smaller than the inside diameter of the wheel rim 22b; accordingly, the total radial fitting space available is used to good effect for a maximum diameter of the hollow shaft 29. Instead of the axial bearing 8 shown in FIG. 1, in the second example embodiment according to FIG. 2 an alternative axial bearing 28 is arranged in the inside space of the hollow journal 23. A supporting shaft 34 is connected to a bearing disk 34a, which is arranged and can slide between the two axial bearings 28. At the other end, the supporting shaft 34 has a collar 34b, which is connected to the supporting disk 31 and thus to the hollow shaft 29, Axial forces that act upon the hollow shaft 29 and hence upon the supporting disk 31 are supported in the axial direction by the supporting shaft 34, which is axially fixed by a pressure disk 30 attached to the bearing journal 23.

Figure 3:
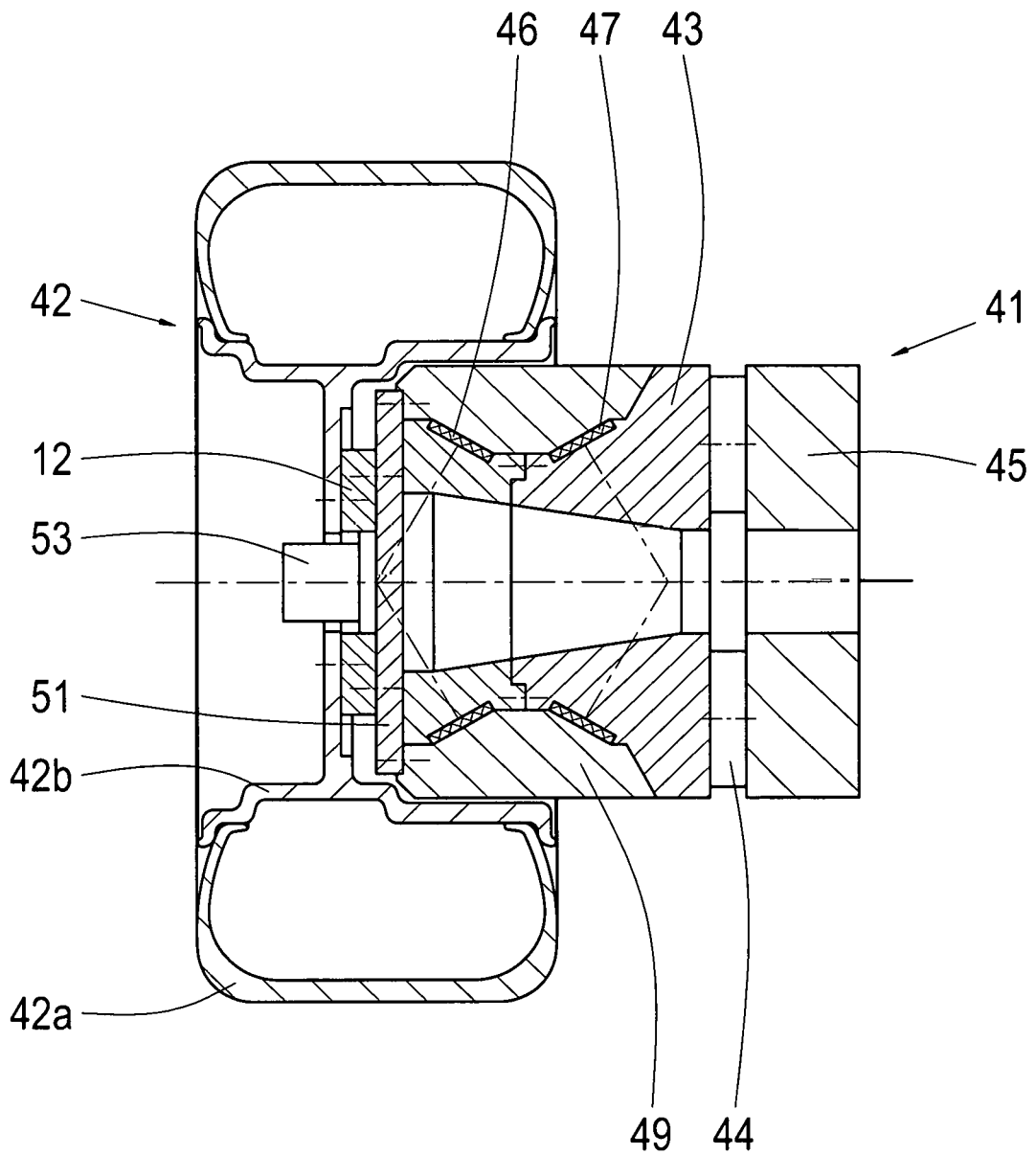
FIG. 3: A third example embodiment of the invention for a wheel mounting with two conical bearings.

FIG. 3 shows a third example embodiment of the invention for a wheel-force dynamometer 41. In the figure the same or analogous components as in FIG. 1 are denoted by the same indexes, but increased by 40. A hollow shaft 49 is mounted relative to a bearing journal 43 by means of a first and a second hydrostatic slide bearings 46, 47 in the form of conical bearings 46, 47, which journal is supported via force sensors 44 on a positionally fixed supporting structure 45. In this case the conical bearings 46, 47 are arranged externally on the hollow journal. The free end of the hollow shaft 49 facing toward the wheel is connected solidly to a supporting disk 51. The outer diameter of the hollow shaft 49 is only very slightly smaller than the inside diameter of the wheel rim 42b. Thus, the total radial fitting space available favors a maximum diameter of the hollow shaft 29, As shown in FIG. 3, in the area of the conical bearings 46, 47 the hollow journal 43 has a radial periphery variation that tapers in a conical manner in an axially central zone. Due to the conical taper the prerequisite for designing the two slide bearings 46, 47 as conical bearings 46, 47 is provided. Thus, the example wheel-force dynamometer shown in FIG. 3 requires only two hydrostatic slide bearings 46, 47 in order to transmit all the forces and torques from the hollow shaft 49 to the hollow journal 43. Since the hollow journal tapers conically in an axially central zone, the pressure effect lines perpendicular to the cone extend outward. Thus the two conical bearings form an O-arrangement which can absorb torques particularly well.

INDEXES

1 Wheel-force dynamometer
2 Wheel

2a Tire
2b Wheel rim
3 Bearing journal
3a Inside surface
3b Bearing seat
4 Force sensor
5 Supporting structure
6 First slide bearing
7 Second slide bearing
8 Third slide bearing
9 Hollow shaft
10 Pressure ring
11 Supporting disk
12 Wheel flange adapter
13 Centering ring
21 Wheel-force dynamometer
22 Wheel
23 Bearing journal
24 Force sensor
25 Supporting structure
26 First slide bearing
27 Second slide bearing
28 Third slide bearing
29 Hollow shaft
30 Pressure disk
31 Supporting disk
34 Supporting shaft
34a Bearing disk
34b Collar
41 Wheel-force dynamometer
42 Wheel
42a Tire
42b Wheel rim
43 Bearing journal
43c Collar
44 Force sensor
45 Supporting structure
46 First slide bearing
47 Second slide bearing
49 Hollow shaft
51 Supporting disk
53 Centering ring

The invention claimed is:

1. A wheel-force dynamometer for measurement of force and torque acting upon a vehicle tire and a vehicle wheel by force sensors,
the vehicle wheel being rotatably supported by a wheel axle,
the wheel axle being in a form of a hollow shaft which is mounted on a rigid, positionally fixed bearing journal, and
the bearing journal is a hollow journal, and a radial periphery of the hollow journal varies so that, in an axially central zone, either the hollow journal tapers in a manner of a cone or the hollow journal thickens in a manner of a cone.

2. The wheel-force dynamometer according to claim 1, wherein the hollow journal has an outer end, on a wheel side, an inner end and a supporting annular cross-section, and the supporting annular cross-section increases from the outer end toward the inner end.

3. A wheel-force dynamometer for measurement of force and torque acting upon a vehicle tire and a vehicle wheel by force sensors,
the vehicle wheel being rotatably supported by a wheel axle,
the wheel axle being in a form of a hollow shaft which is mounted on a rigid, positionally fixed bearing journal, and
the hollow shaft is mounted relative to the bearing journal, by hydrostatic slide bearings.

4. The wheel-force dynamometer according to claim 1, wherein the bearing journal has a collar which is supported on a positionally fixed supporting structure.

5. The wheel-force dynamometer according to claim 4, wherein the force sensors are arranged between the collar and the supporting structure.

6. The wheel-force dynamometer according to claim 3, wherein a first hydrostatic slide bearing is in a form of a radial bearing arranged at a wheel-side end of the bearing journal and a second hydrostatic slide bearing is in a form of a radial bearing arranged at an inside end of the bearing journal.

7. The wheel-force dynamometer according to claim 6, wherein a third hydrostatic slide bearing is designed as an axial bearing.

8. The wheel-force dynamometer according to claim 7, wherein the second and third hydrostatic slide bearings are in a form of a combined, L-shaped radial and axial bearing.

9. The wheel-force dynamometer according to claim 1, wherein a first and a second hydrostatic slide bearing are in a form of conical bearings, which are arranged at a location where the radial periphery of the bearing journal changes.

10. The wheel-force dynamometer according to claim 7, wherein the axial bearing is arranged inside the hollow bearing journal and is connected to the hollow shaft by a supporting shaft.

11. The wheel-force dynamometer according to claim 1, wherein an end of the hollow shaft is connected to a supporting disk.

12. The wheel-force dynamometer according to claim 11, wherein the supporting disc is connectable to the vehicle wheel.

13. The wheel-force dynamometer according to claim 12, wherein a wheel flange adapter is arranged between the supporting disk and the vehicle wheel.

14. The wheel-force dynamometer according to claim 10, wherein the supporting shaft is connected to the hollow shaft by way of a supporting disk.

15. The wheel-force dynamometer according to claim 11, wherein a centering ring is arranged on the supporting disk.

16. A wheel-force dynamometer for measurement of force and torque acting upon a vehicle tire and a vehicle tire and a vehicle wheel,
the wheel force dynamometer having sensors arranged between a positionally fixed supporting structure and a first axial end of a rigid, fixed bearing journal,
the bearing journal being supported by the supporting structure,
a wheel axle having a wheel end that is connected to the vehicle wheel and opposite to the supporting structure, the wheel axle being hollow and rotationally supported, via hydroststic slide bearings, on an outside surface of the bearing journal, the bearing journal being hollow and having an inside surface that is conically shaped such that an axial cross section of the bearing journal increases from a second xial end of the bearing journal toward the first axial end of the bearing journal.

* * * * *